United States Patent

Joslyn

[15] 3,649,895

[45] Mar. 14, 1972

[54] MOTOR CONTROL SYSTEM

[72] Inventor: John A. Joslyn, Dalton, Mass.

[73] Assignee: General Electric Company

[22] Filed: Dec. 20, 1968

[21] Appl. No.: 785,643

[52] U.S. Cl. ....................318/331, 318/345

[51] Int. Cl. ....................H02p 5/00

[58] Field of Search ..........318/308, 331, 434, 328, 314–320, 318/20.430, 619, 620

[56] References Cited

UNITED STATES PATENTS

| | | | |
|---|---|---|---|
| 3,543,118 | 11/1970 | Koenig | 318/331 |
| 3,515,971 | 6/1970 | Joslyn et al. | 318/332 X |
| 3,413,534 | 11/1968 | Stringer | 318/308 |
| 3,419,777 | 12/1968 | Asseo | 318/338 |

*Primary Examiner*—J. D. Miller
*Assistant Examiner*—Robert J. Hickey
*Attorney*—Frank L. Neuhauser, Oscar B. Waddell, Carl B. Baker, Joseph B. Forman and Francis K. Richwine

[57] ABSTRACT

A motor control system utilizing a phase control power amplifier with controlled rectifiers which include circuit means to vary the magnitude of the actuating signals to said power amplifier as a function of the magnitude of a back EMF signal from the motor to compensate for gain variations occuring in the phase control power amplifier. In order to linearize the relationship between motor current and input control signal applied to the motor control system for all conditions of motor EMF, a voltage amplifier having a gain which varies nonlinearly with said input control signal is placed between the source of these input signals and the power amplifier itself. The gain of this voltage amplifier is appropriately varied by an associated circuit network. A positive feedback signal proportional to the motor back EMF value is combined with the output signal from the variable gain amplifier.

3 Claims, 4 Drawing Figures

INVENTOR
JOHN A. JOSLYN

BY J.F. McDevitt
HIS ATTORNEY

INVENTOR
JOHN A. JOSLYN
BY J.F. McDevitt
HIS ATTORNEY

INVENTOR
JOHN A. JOSLYN
BY J. F. McDevitt
HIS ATTORNEY

MOTOR CONTROL SYSTEM

BACKGROUND OF THE INVENTION

This invention relates to motor control systems more particularly, to motor controlled systems using phase control power amplifiers. Specifically, the present invention provides electronic circuit means for linearizing the inherent gain variation of a phase controlled power amplifier employed in a motor control system which includes use of a nonlinear gain voltage amplifier to control said power amplifier. Phase controlled power amplifiers are used in motor control systems for controllably supplying direct current electrical energy from alternating current sources to direct current drive motors. The amount of energy supplied to the drive motor is varied by changing the firing angles of controlled rectifiers contained in these power amplifiers. In servo mechanism applications for such control systems, gain variation in the power amplifier has various undesirable effects upon the servomechanism response. There are two principal reasons for gain variation in the phase control power amplifier. The sinusoidal shape of the applied alternating current power is the first source of gain variation in the power amplifier for such applications. Near the crossover point a change of firing angle produces a small change in average output voltage. Near the peak of the applied alternating current power, an identical change in firing angle produces a much bigger change in average output voltage. The inductive nature of the motor armature is a second principal source of variation in these applications. For small firing angles, the motor current is discontinuous and the motor armature time constant is not present. However, the motor current continues to flow after the applied voltage wave shape has crossed the zero point. The average output voltage is, therefore, less than the expected value because of the voltage polarity reversal during part of the conduction time. The motor current becomes continuous when the firing angle has been sufficiently advanced. The foregoing sources of gain variation interact to cause zero gain at zero firing angle, a slowly increasing gain as the firing angle is advanced in the discontinuous current region, and high gain in the continuous current region. As the firing angle is advanced beyond 90°, the continuous region gain will drop gain due to the sinusoidal applied power. The transition from the discontinuous current region to the continuous current region can produce a discontinuity in the gain characteristics for a particular phase but since all phases do not have identical firing angles the gain changes rapidly but not discontinuously at this transition. Numerous attempts have been made to correct for these nonlinearities, but many of the heretofore applied techniques have resulted either in the introduction of a different nonlinearity into the system or an overly complex control system.

It is the principal object of this invention to provide an improved motor control system having a phase control power amplifier which responds linearly to input signals for activation of the controlled rectifiers at small firing angles.

Still another important object of this invention is to provide a motor control system which compensates for inherent gain variation of its phase control amplifier.

Still another important object of this invention is to provide a motor control system which can produce the compensation with a single circuit instead of compensating a plurality of individual firing circuits for the phase control amplifier.

Briefly, it has been discovered that a positive feedback signal proportional to the back EMF value in the controlled motor can be used to provide a linear relationship between the motor current and the input control signal for the motor. In one embodiment said input control signal is applied to a variable gain amplifier and the output signal from said amplifier is summed regeneratively with a feedback signal proportional to the motor back EMF to provide an actuating signal for the power amplifier. In a different embodiment, said output signal from the variable again amplifier is referenced to the positive feedback signal proportional to motor back EMF.

BRIEF DESCRIPTION OF DRAWINGS

Referring now in more detail to the drawings, FIG. 1 depicts a motor control system which is compensated for nonlinearities in the gain of the phase control power amplifier by means of a motor back EMF feedback signal and a nonlinear or variable gain amplifier. A servo block diagram system has been selected for clarity of illustrating the operational features of the invention and it will be apparent from the detailed description of the different embodiments which follow that various means are contemplated to generate said back EMF control signal. In the generalized system shown, a drive motor such as a direct current shunt motor 10 is energized through conductors 12 and 14 to drive load 16 through coupling means 18. Performance of the drive motor is controlled by means of regulator 20 wherein a servo signal from command source 22 after passage through nonlinear amplifier 24 is summed in amplifier 26 with a positive motor EMF feedback signal 28 generated by tachometer 30 which is proportional to motor back EMF. The output signal from summing amplifier 26 is an error signal supplied to conductor 32 which is compensated for the gain variation in the power amplifier 33. The command source 22 may comprise any convenient means for generating reference signals having a magnitude proportional to the desired current in the drive motor 10. For example, it may comprise a regulated power supply, a computer, a tachometer generator driven by a master drive system etc. The reference signals may be reversible in polarity or may have a single polarity depending upon desired operation of the controlled motor. For the linearity compensation, feedback signals proportional to the motor back EMF signal are supplied to summing amplifier 26 for combination with the output signal from nonlinear amplifier 24 which is a direct current amplifier having two linear operating regions to provide the power amplifier gain correction necessary when operating over the range of small to large firing angles. The positive or regenerative tachometer feedback signals are summed in amplifier 26 with the compensated servo signal to provide power amplifier gain in correction over the ranges from zero to maximum motor back EMF. Specifically, output signals from the summing amplifier are applied to firing circuits (not shown) in the proper amplifier to vary the magnitude of the actuating signals at the small firing angles as a function of the magnitude of the motor back EMF and results in linear response of the motor current with variation of the applied control voltage signal to nonlinear amplifier 24.

Figure 1:
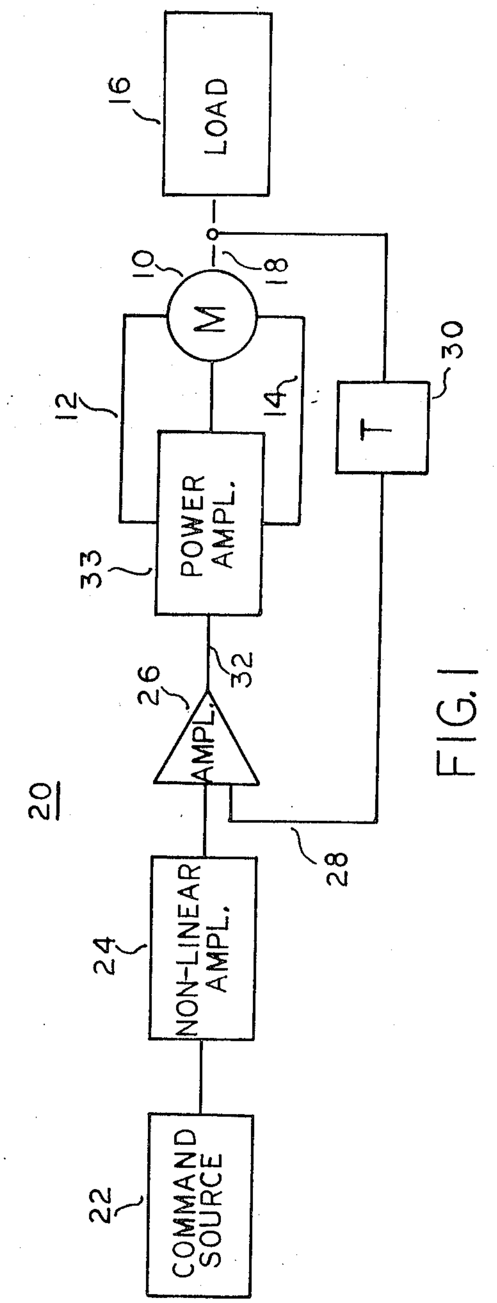
FIG. 1 is a block diagram of the motor control system constructed in accordance with the principles of this invention.

A phase controlled power amplifier of the type referred to in the specification and claims usually includes either one or a plurality of controlled rectifying devices for applying electrical energy from an alternating voltage source to the controlled device such as the drive motor 10. It also includes control circuits for turning on the controlled rectifying devices at various phase angles of the applied alternating current voltage to control the amount of energy applied to said motor. A typical transfer or gain function for such power amplifier has a nonlinear relationship between output current from the amplifier and the actuating voltage at the input of the amplifier. At small firing angles when the firing of the controlled rectifiers is retarded, the slope of the curve which can be generated by a plot of the aforementioned amplifier characteristics changes showing that the gain of the phase control power amplifier is changing. To maintain linearity of response in said power amplifier as a function of motor speed it becomes necessary to supply actuating signals which include means for varying the magnitude of the actuating signals as a function of the magnitude of the motor back EMF. In accordance with the practice of this invention, said means utilizes positive feedback of the back EMF signal in association with the output signal from the nonlinear amplifier. A more detailed description of circuitry for accomplishing positive feedback of the motor back EMF in the particular embodiment is recited below for FIG. 2.

A nonlinear amplifier having the proper performance characteristics for the aforementioned compensation can be designed in accordance with the general principles taught in copending U.S. Pat. application Ser. Number 666,061 entitled "Motor Control System", John A. Joslyn and William J. Lubitz, filed Sept. 7, 1967, issue June 2, 1970 as Pat. Number 3,515,971 and assigned to the assignee of the present invention. As illustrated and described in FIG. 2 in said aforementioned patent the gain function of the nonlinear amplifier is derived from a plot of the desired linear gain response in the power amplifier using motor output current as the ordinate and input voltage levels to the overall amplifier combination as the abscissa. Also plotted on the same coordinates is a typical curve for the uncompensated power amplifier at a representative speed of the motor. By entering this plot with a chosen input voltage level for the nonlinear amplifier 24 moving vertically up the ordinate to the desired linear gain curve for the power amplifier, then horizontally to the right until intersection with the uncompensated gain curve for the power amplifier and finally back down vertically to the voltage scale for a value which is the desired nonlinear amplifier output voltage for linear response. The desired motor current level caused by the power amplifier when responding linearly at the chosen input voltage level to the nonlinear amplifier is also available from the aforementioned type plot. Said output current value is found by proceeding horizontally to the ordinate from the intersection point of the vertical input voltage line at the selected level with the linear gain curve for the power amplifier. By repeating this procedure over the operating range of the power amplifier the gain characteristic of a nonlinear amplifier adapted for use in the combination to produce linear response is obtained. If said results are plotted for the nonlinear amplifier with output voltage as the ordinate and input voltage as the abscissa, a curve is obtained defining the needed gain function for the nonlinear amplifier. An amplifier designed in accordance with such gain characteristics can be a conventional differential input amplifier having a feedback network which varies gain in accordance with the magnitude of its output voltage. A typical feedback network for such nonlinear amplifier 24 is shown schematically in FIGS. 2–4.

In operation, the nonlinear amplifier provides a linear gain characteristic for controlled rectification at zero speed. At any other speed, the back Emf causes the gain characteristic to shift from the zero speed characteristic depending the direction of rotation for the motor. At small firing angles the nonlinear amplifier operates in the higher gain region to provide larger firing angle change per unit voltage input change. Conversely, the nonlinear amplifier operates in its lower gain region at larger firing angles. A shift from the high gain region to the low gain region is carried out in the particular nonlinear amplifier configuration to be hereinafter described in FIGS. 2–4 by means of an associated feedback loop. The compensation of firing angle shift with back EMF is achieved by summation of the nonlinear amplifier output with the back EMF signal.

Figure 2:
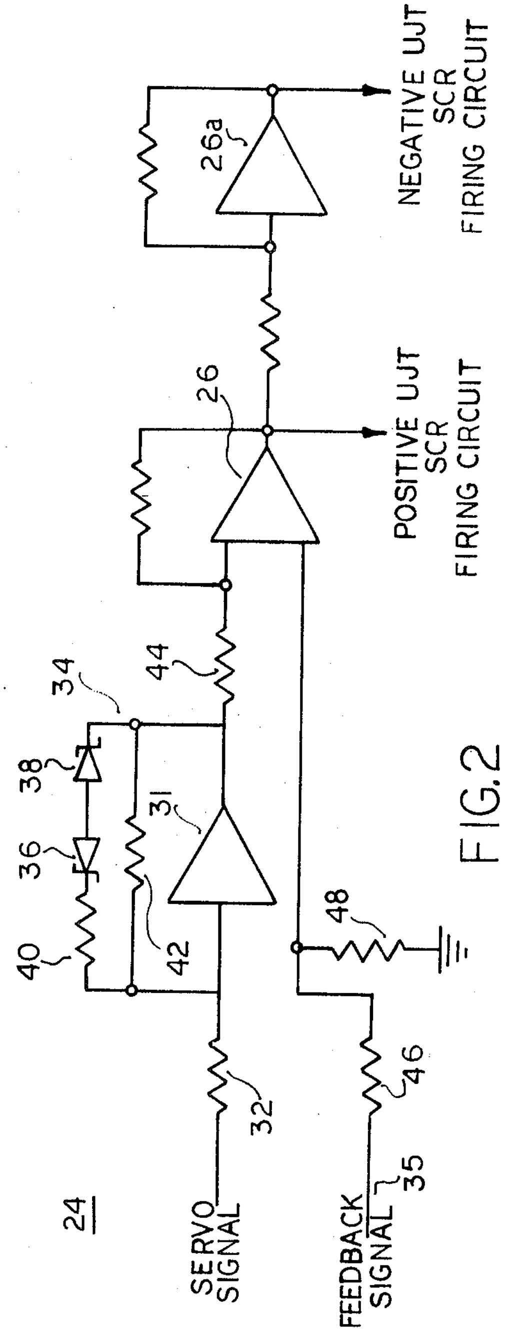
FIG. 2 is a schematic diagram for the linearizing circuit portion of the motor control system shown in FIG. 1.

FIG. 2 is a schematic diagram showing the linearizing circuit portion of the motor control system described in FIG. 1. The servo signal from a command source is supplied across resistor 32 as an input signal to nonlinear amplifier 24. In the particular embodiment a differential input feedback amplifier 31 is employed having feedback loop 34 which includes zener diodes 36 and 38 and resistor 40 in series and resistor element 42 in parallel enables shift of operation from the high gain region to the low gain region when the threshold value of the zener diodes is exceeded. The output voltage signal from said nonlinear amplifier is supplied across resistor 44 to summing amplifier 26. A tachometer signal 35 in the form of a direct current voltage which is proportional to motor speed is supplied across resistor 46 providing a second input signal to said summing amplifier 26. Positive feedback is accomplished by summation of an output servo signal which has been inverted in amplifier 31 with the noninverted tachometer output signal. Grounding resistor 48 facilitates proper summation of the two input signals in summing amplifier 26. The summed output signal from summing amplifier 26 is supplied to one set of conventional unijunction transistor firing circuits (not shown) which control the operation of power amplifier 33. A second output stage 26a in said summing amplifier supplys a summed output signal to a second set of unijunction transistor firing circuits in the power amplifier controlling oppositely conducting SCR's. In the above described manner, the phase control power amplifier energizes the motor 10 for movement in either of its two directions of rotation with a proper degree of compensation being supplied to provide linear response over the range of firing angles.

Figure 3:
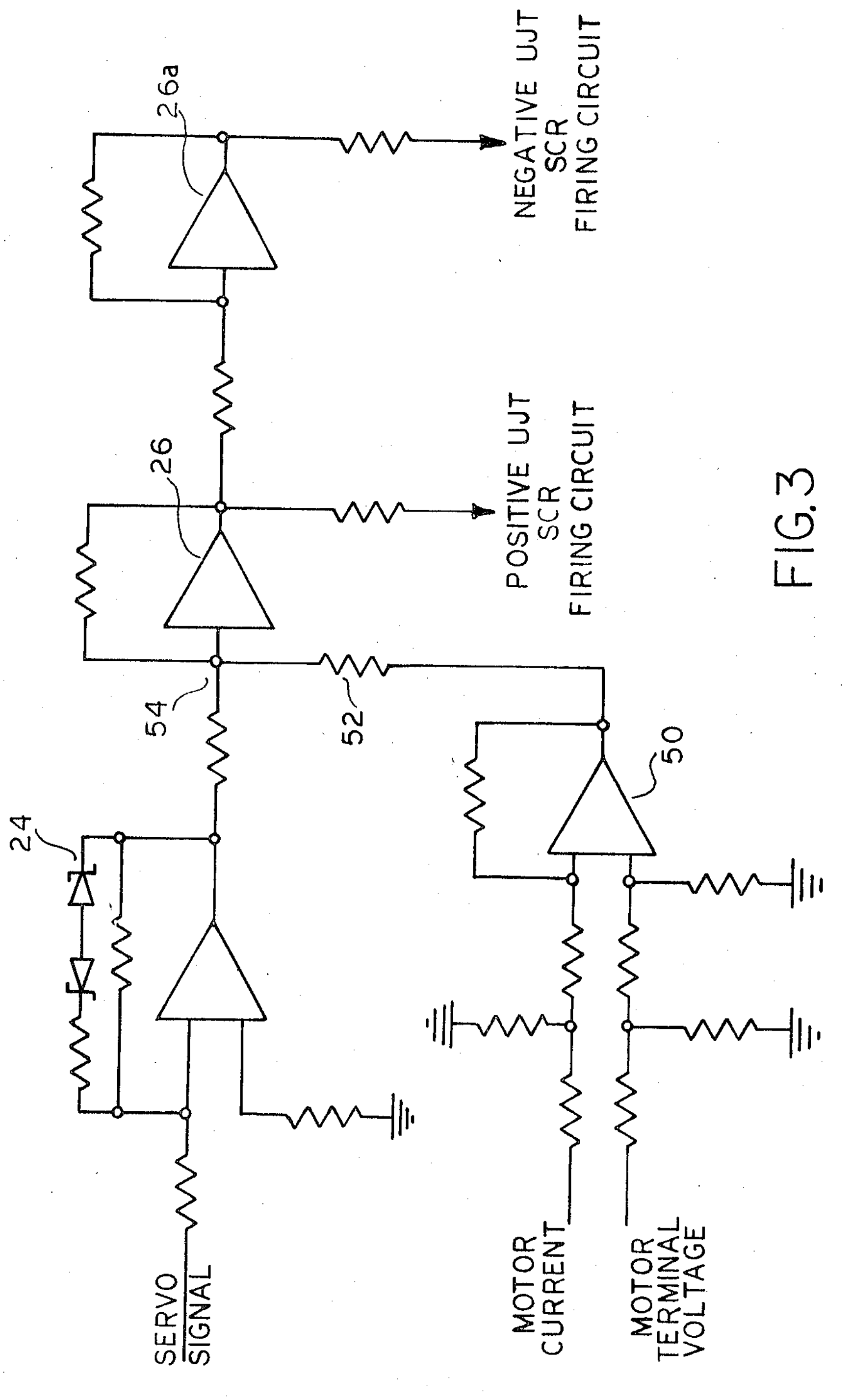
FIG. 3 is a schematic diagram showing different linearizing circuit means for a control system made in accordance with the principles of this invention.

FIG. 3 is a schematic diagram showing an alternate embodiment for deriving electronically a positive feedback signal proportional to the motor back Emf value. An analog signal proportional to motor back EMF is generated in amplifier 50 from a dual input of the motor current and motor terminal voltage. Derivation of said analog is based upon variation in motor signal values with speed conditions. The back EMF voltage increases with motor speed at a value equal to the difference between motor current times motor armature resistance and the motor terminal voltage. The EMF voltage is zero at zero motor speed and increases to some fixed value when the motor reaches demand speed. The analog signal derived in said manner is applied across resistor 52 to junction point 54 for addition with a servo signal which has been processed in nonlinear amplifier 24 as hereinbefore described. Again, there is a positive feedback of the motor back EMF signal to summing amplifier 26 for the gain correction whereby overall response is kept linear and the motor achieves demand current. The output from the dual output stages of said summing amplifier are supplied to the firing circuits in the same manner described in FIG. 2.

In all above embodiments shown for compensating inherent gain variation of the power amplifier it will be appreciated that the input signal to the power amplifier represents a value of the control voltage needed to keep the overall response linear and the motor at demand current. Linearity of response is maintained when the back EMF signal shifts the zero crossing point due to the operational characteristics of the associated nonlinear amplifier. The back EMF signal provides a sustaining value of control voltage in order to compensate for the new zero crossing point.

Figure 4:
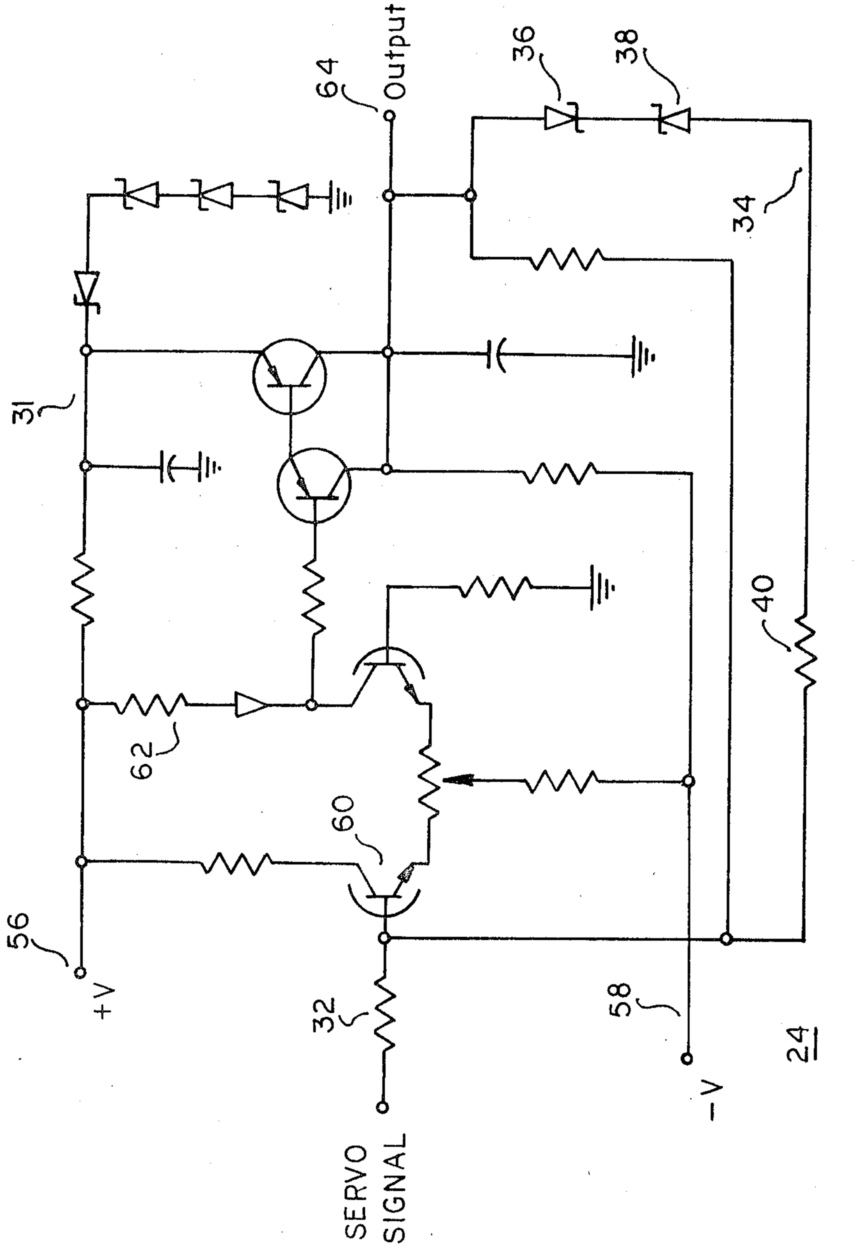
FIG. 4 is an electrical schematic diagram for a variable gain amplifier suitable for use in practice of the present invention.

FIG. 4 is an electrical schematic diagram for a typical nonlinear amplifier 24 useful in the practice of the present invention. A differential input feedback amplifier 31 is provided having feedback network 34 formed by serial connection of zener diodes 36 and 38 with resistor element 40 all in parallel with resistor element 42. Supply terminals 56 and 58 are provided with power supply voltages of opposite polarity. The servo signal is supplied across resistor 32 to the base electrode of input transistor 60 in the differential input stage 62 of said amplifier. The compensated servo signal is supplied to terminal 64 of the amplifier.

The invention is not limited to the particular details of the preferred embodiments above described. It is contemplated in various modifications and applications within the scope of this invention will occur to those skilled in the art. For example, those skilled in the art will recognize that many different means can be provided for varying the magnitude of the actuating signals to the power amplifier as a function of the magnitude of the motor back EMF. For example, the variable gain amplifier feature can be obtained with a fix gain amplifier operatively associated with a variable gain attenuating network wherein the output signal from the amplifier-network combination is referenced to a voltage which is a function of the motor back Emf value. In this manner the summing amplifier described in the above preferred embodiments can be eliminated. It is therefore intended that the appended claims cover such modifications which do not depart from the scope and spirit of this invention.

What I claim as new and desired as secured by Letters Patent in the United States is:

1. In an improved motor control system drive motor means; power amplifier means including controlled rectifier means connected to an alternating-current source for applying electrical energy to said motor means; and compensating means for supplying actuating signals to said power amplifier responsive to control signals from a command source, said compensating means including a variable gain amplifier which varies nonlinearly with said control signals to continuously compensate for the nonlinear response to said power amplifier, the improvement comprising the provision of combining means responsive to said compensating means and to motor speed to modify said actuating signals flowing to said power amplifier as a function of the magnitude of the motor back EMF, said combining means adding to the said actuating signals from the variable gain amplifier a signal of like polarity representing the motor back EMF to form a modified actuating signal.

2. The improved motor control system comprising the combination of drive motor means; power amplifier means including controlled rectifier means connected to an alternating-current source for applying electrical energy to said motor means; compensating means for supplying actuating signals to said power amplifier responsive to control signals from a command source, said compensating means including a variable gain amplifier which varies nonlinearly with said control signals to continuously compensate for the nonlinear response to said power amplifier; with the improvement constituting summing means between said compensating means and said power amplifier to modify said actuating signals en route to said power amplifier as a direct function of the magnitude of the motor back EMF wherein the actuating signals from the variable gain amplifier are combined with a positive feedback signal of like polarity representative of the back EMF value.

3. In a motor control system, of the type having a direct current motor; a source of motor control signals; power amplifier means including controlled rectifier means responsive to said control signals for applying electrical energy from an alternating-current source to said motor; and compensating means interposed between said source and said power amplifier, said compensating means including a variable gain amplifier for modifying said control signals to compensate for the nonlinear response of said power amplifier; the improvement wherein said compensating means also includes a summing amplifier connected between the variable gain amplifier and the power amplifier, and further includes positive feedback signal generating means responsive to performance of said motor for producing a feedback signal of the same polarity as said control signals which is representative of the back EMF of said motor, said summing amplifier being responsive to and summing together the said control signals as modified by said variable gain amplifier and the said feedback signal representative of motor back EMF to produce control signals which are modified to compensate for both the nonlinearity of the power amplifier and back EMF of the motor.

* * * * *